United States Patent
Gilman et al.

(10) Patent No.: US 6,229,624 B1
(45) Date of Patent: May 8, 2001

(54) TRANSFORM FOR DIGITAL IMAGES

(75) Inventors: Paul B. Gilman, Penfield; John F. Hamilton, Jr., Rochester; Richard M. Vogel, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/057,903

(22) Filed: Apr. 9, 1998

(51) Int. Cl.$^7$ .............................. B41B 15/00; G03F 3/08
(52) U.S. Cl. ...................... 358/1.9; 358/518; 358/519; 358/521; 345/150; 345/153
(58) Field of Search ...................... 358/1.9, 518, 519, 358/521, 504, 455, 406; 345/150, 153

(56) References Cited

U.S. PATENT DOCUMENTS

| | | |
|---|---|---|
| 4,792,518 | 12/1988 | Kuwashima et al. . |
| 5,300,381 | 4/1994 | Buhr et al. . |
| 5,528,339 | 6/1996 | Buhr et al. . |
| 5,913,014 * | 6/1999 | Gilman, Jr. et al. .................. 358/1.9 |

OTHER PUBLICATIONS

"The Tone Reproduction of Colour Photographic Material," R.W.G. Hunt, I.T. Pitt, and P.C. Ward, J. Photog. Sci., 17:198(1969).
W.H. Carnahan in *Photographic Engineering*, 6, 237 (1955).
Adobe Photoshop Software Program 3.0 or 4.01 manufactured by Adobe, San Jose, CA.

\* cited by examiner

*Primary Examiner*—Edward L. Coles
*Assistant Examiner*—Twyler Lamb
(74) *Attorney, Agent, or Firm*—Raymond L. Owens

(57) ABSTRACT

A method for selecting an aim curve for a desired medium having a predetermined maximum density, including selecting an aim curve from a family of aim curves for a different medium having a lower predetermined maximum density than that of the desired medium, the aim curve having shadow, midtone, and highlight regions; varying the shadow contrast in the shadow region of the selected aim curve to produce a different aim curve; and determining the different aim curve with the desired medium that has an improved shadow contrast that will produce prints with reduced flare and permits a better fit of the dynamic range of the original scene to the dynamic range of the medium.

12 Claims, 3 Drawing Sheets

TRANSFORM FOR DIGITAL IMAGES

CROSS REFERENCE TO RELATED APPLICATIONS

The present invention is related to commonly assigned U.S. patent application No. 08/897,868 filed Jul. 21, 1997, entitled "Transforms for Digital Images" to Gilman et al. The disclosure of this related application is incorporated herein by reference.

FIELD OF THE INVENTION

This invention relates to a method of constructing a transform for improving the display or making prints from digital images.

BACKGROUND OF THE INVENTION

It is important in producing displays or prints from digital images to fit the dynamic range of the originally captured scene to the dynamic range of the materials available for displaying or printing using the best possible transform. A limiting factor is the dynamic range of the materials available for displaying or printing. By selectively choosing the proper transform for displaying or printing, it is possible to display or print esthetically pleasing images on materials that have less dynamic range than the original scene.

As new materials such as thermal print media and receivers and ink jet technologies have become available for displaying or printing, they have introduced wider dynamic ranges than available with previous technologies. It is well known how to display or print digital images on these types of media. However, it is difficult to design different transforms that best take advantage of these new media. A key element in any new transform is to be able to utilize the full dynamic range of the media for displaying or printing the digital images.

There have been a number of techniques for improving the tone reproduction of digital images, see for example, U.S. Pat. No. 4,792,518 and U.S. Pat. No. 5,300,381. For a discussion of tone reproduction and the effect of flare on print quality, see "The Tone Reproduction of Colour Photographic Materials," R. W. G. Hunt, I. T. Pitt, and P. C. Ward, J. Photog. Sci., 17:198(1969). Flare light is generally ambient light which degrades the viewed image on the print.

As set forth in the above disclosures, a number of techniques are disclosed which require that the media be silver halide photographic media and the techniques for making the images are very complex. The publication by Hunt et al describes the "ideal system" for printing photographic images to correct for camera flare, printer flare, and viewing flare but offered no practical way to implement this theoretical tone reproduction curve because of the lack of digital imaging tools and the limitations of the materials available in 1969.

U.S. Pat. No. 5,528,339 discloses techniques for improving the tone reproduction of digital images on other media such as thermal, ink jet and electrophotographic. However, the presently available media for the printing of the digital images far exceeds the dynamic range previously described by having lower minimum densities and considerably higher maximum densities.

SUMMARY OF THE INVENTION

It is an object of the present invention to facilitate the printing of digital images with improved tone reproduction and ensuring that such images provide esthetically pleasing results and which minimizes the effects of flare and permits a better fit of the dynamic range of the original scene to the dynamic range of the print media. In the process of capturing digital images and making prints from such digital images, flare is introduced in two ways. The first is by ambient light at the time of capture, and the second is by ambient light at the time of viewing of the print or display. In a typical silver halide photographic process, flare takes place in three ways. The first is at the time of exposure. The second is when the optical print is made. The third is when the optical print is viewed.

It is another object of the present invention to provide new techniques for improving the image quality of digital images on displays with a wider dynamic range than previously available.

These objects are achieved by in a method for selecting an aim curve for a desired medium having a predetermined maximum density, comprising the steps of:

a) selecting an aim curve from a family of aim curves for a different medium having a lower predetermined maximum density than that of the desired medium, the aim curve having shadow, midtone, and highlight regions;

b) varying the shadow contrast in the shadow region of the selected aim curve to produce a different aim curve; and c) determining the different aim curve with the desired medium that has an improved shadow contrast that will produce prints with reduced flare and permits a better fit of the dynamic range of the original scene to the dynamic range of the medium.

The present invention recognizes that unlike the typical silver halide photographic process when prints are made from digital images, flare, is also a function only of ambient light which takes place at the time of camera exposure and as well as ambient light when viewing the print or display. It is therefore an advantage of the present invention to produce a transform which can be used either in soft displays for displaying images or for use in printing black and white or colored images and which minimizes the effects of flare and permits a better fit of the dynamic range of the original scene to the dynamic range of the print media. This technique can be readily implemented in a computing system. Such a computing system can include a microprocessor which can produce continuous tone prints which are esthetically pleasing.

In accordance with the present invention, the original scene image is not duplicated, but the tone reproduction of it's corresponding digital image is shaped so as to produce an esthetically pleasing display or print which minimizes flare effects and permits a better fit of the dynamic range of the original scene to the dynamic range of the print media.

It is a feature of the present invention that it optimizes tone reproduction in the Dmin (minimum image reflection density) and Dmax (maximum image reflection density) regions of display or print material.

DETAILED DESCRIPTION OF THE INVENTION

The present invention has recognized that, with digital imaging, an aim curve is produced which will minimize the effects of flare and permits a better fit of the dynamic range of the original scene to the dynamic range of the print media.

Figure 1:
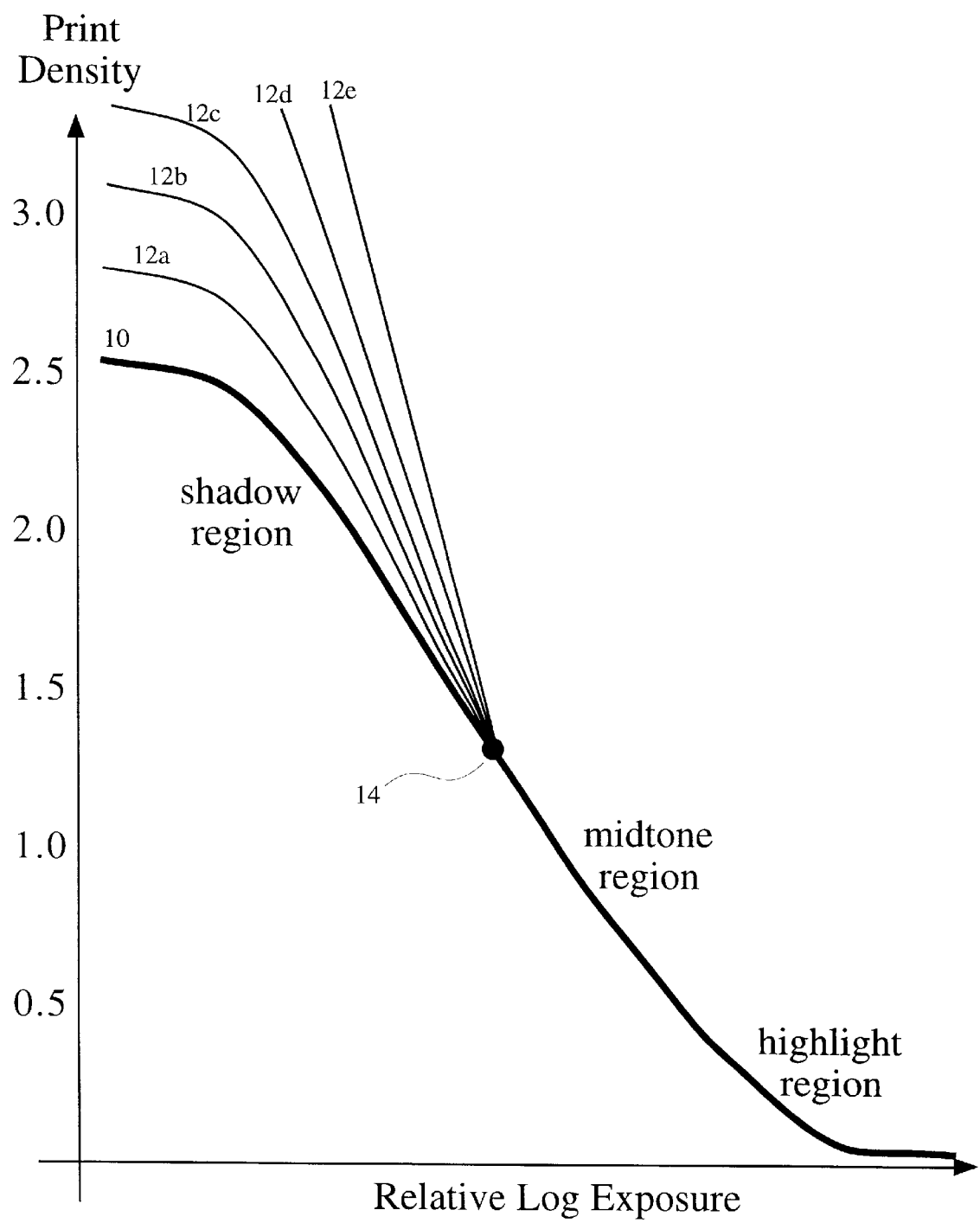
FIG. 1 is a set of aim curves which show a prior aim curve and a series of curves modified to boost the upper scale contrast of the prior aim curve.

In order to construct a transform for a predetermined display or printer which can produce either a black and white or color image, the following process can be used. First, referring to FIG. 1, there is shown a set or family of aim curves. A prior aim curve 10 is frequently used in making output prints or displays. This prior aim curve is constructed for use with media which are incapable of producing reflection densities greater than 2.5. All of the aim curves 10, 12a–e shown have shadow, midtone, and highlight regions. The shadow region as described herein starts at a breakpoint 14, which is the point of highest density shared by all members of the family of curves 10, 12a–e. The breakpoint 14 is, of course, selectable by the user. Typically the breakpoint 14 is in a range of 0.8 to 1.5 reflection density. The lowest portion on the aim curve 10 is the highlight region, typically a density range from 0.0 to 0.3. The remaining density range between the shadow and highlight regions is called the midtone region. While many printing technologies can not exceed a reflection density of 2.5, others such as ink jet can exceed 2.5 and are particularly suited for use with the present invention. For a user of such extended range printers, the family of aim curves 12a–e provides choices to match the density range of the image and to minimize the problem of flare in accordance with the present invention. How these curves are constructed will be discussed shortly.

The maximum density that can be measured in a densitometer depends on the geometry of illumination and viewing in the instrument. The interiors of densitometers are usually very carefully blackened to reduce the stray light as much as possible. When reflection print images are viewed in typical room conditions, the flare light reflected by the top surface of the print is usually much higher than in a densitometer. As a result, the densities perceived in rooms are normally much lower than those measured in densitometers (see, for instance, the paper by W. H. Carnahan in *Photographic Engineering*, 6, 237 (1955)). Where the term "print density" and "modified print density" are used herein, they are to be understood to be quantities measured in a typical densitometer having very little stray light. When these densities are viewed in typical room conditions, the flare light in the room will considerably reduce the densities, but the higher values of the "modified print densities" will result in darker perceived dark-greys and blacks than those perceived when viewing the unmodified print densities.

The present invention constructs a transform for a predetermined display or printer, with such printer or display being able to form a black and white or color image on a particular medium. The input to the constructed transform is a digital image file produced by a particular image capture device. In this process, there is first provided an input characteristic function which relates the color code values recorded by the image capture device to the relative log exposure values present in the scene. Thus, each color code value in the captured image has a corresponding relative log exposure value. Furthermore, using the prior art curve 10 (FIG. 1), each relative log exposure value has a corresponding print density. Let F(x) denote the function which, in accordance with aim curve 10, assigns a print density to any relative log exposure. Then, aim curve 10 can be expressed algebraically as the equation:

$$y = F(x) \quad (1)$$

in which:
x denotes relative log exposure; and
y denotes print density.

The present invention constructs new aim curves by modifying the values of such assigned print densities.

As a preliminary step, the present invention requires an upper scale contrast boost from a density boost function B(y) which is defined as follows:

$$B(y) = \begin{bmatrix} 0 & \text{if } y < y_0 - h \\ \dfrac{\operatorname{Tan}(\theta)}{4h}[y - (y_0 - h)^2] & \text{if } y_0 - h \leq y \leq y_0 + h \\ \operatorname{Tan}(\theta)(y - y_0) & \text{if } y_0 - h < y \end{bmatrix}$$

in which:
y denotes any print density;
$y_0$ denotes a particular print density;
θ denotes a particular angle of inclination; and
h denotes a particular small increment of print density.

Figure 2A:
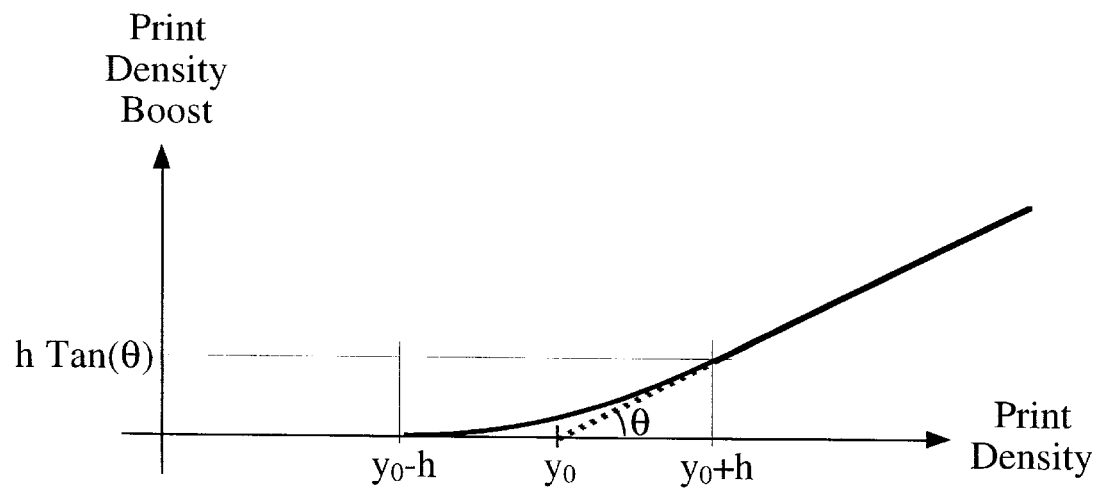
FIGS. 2a and 2b show a graph of print density boost vs. original print density which can be used in constructing an aim curve in accordance with the present invention.
Figure 2B:
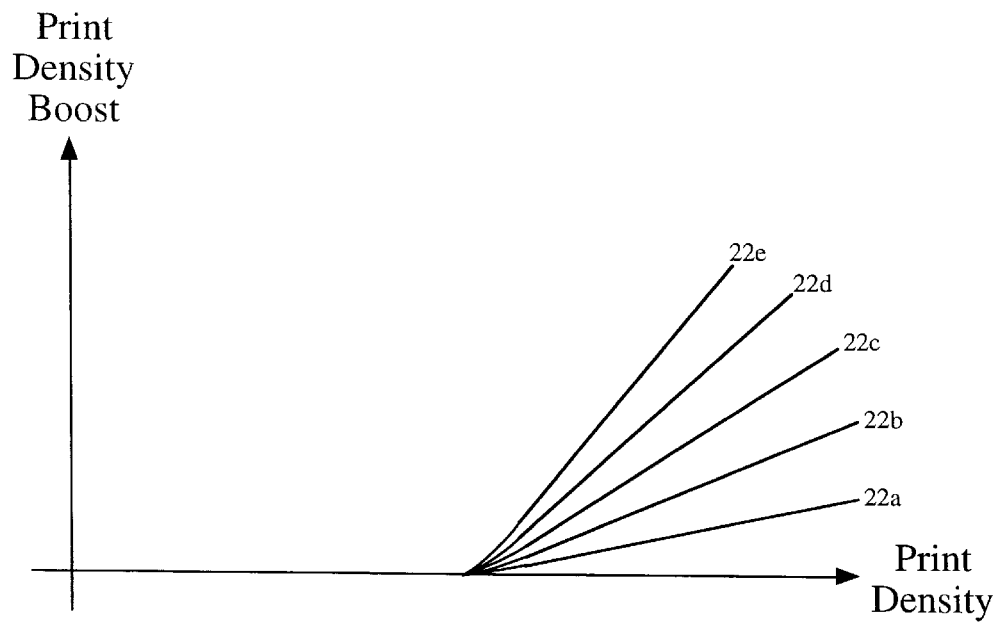

In FIG. 2A is shown a graph of such a boost function. In FIG. 2B is shown a set or family of boost curves having the same values of $y_0$ and h, but differing values of θ. The curves 22a–e, respectively, show increasing amounts of upper scale density boost. Useful values of $y_0$, θ, and h are 1.55, 63°, and 0.3, respectively.

When the print boost value B(y) is added to the value of y itself, a modified print density is obtained as shown in the following equation:

$$z = y + B(y) \quad (2)$$

in which:
y denotes print density; and
z denotes modified print density.

Figure 3:
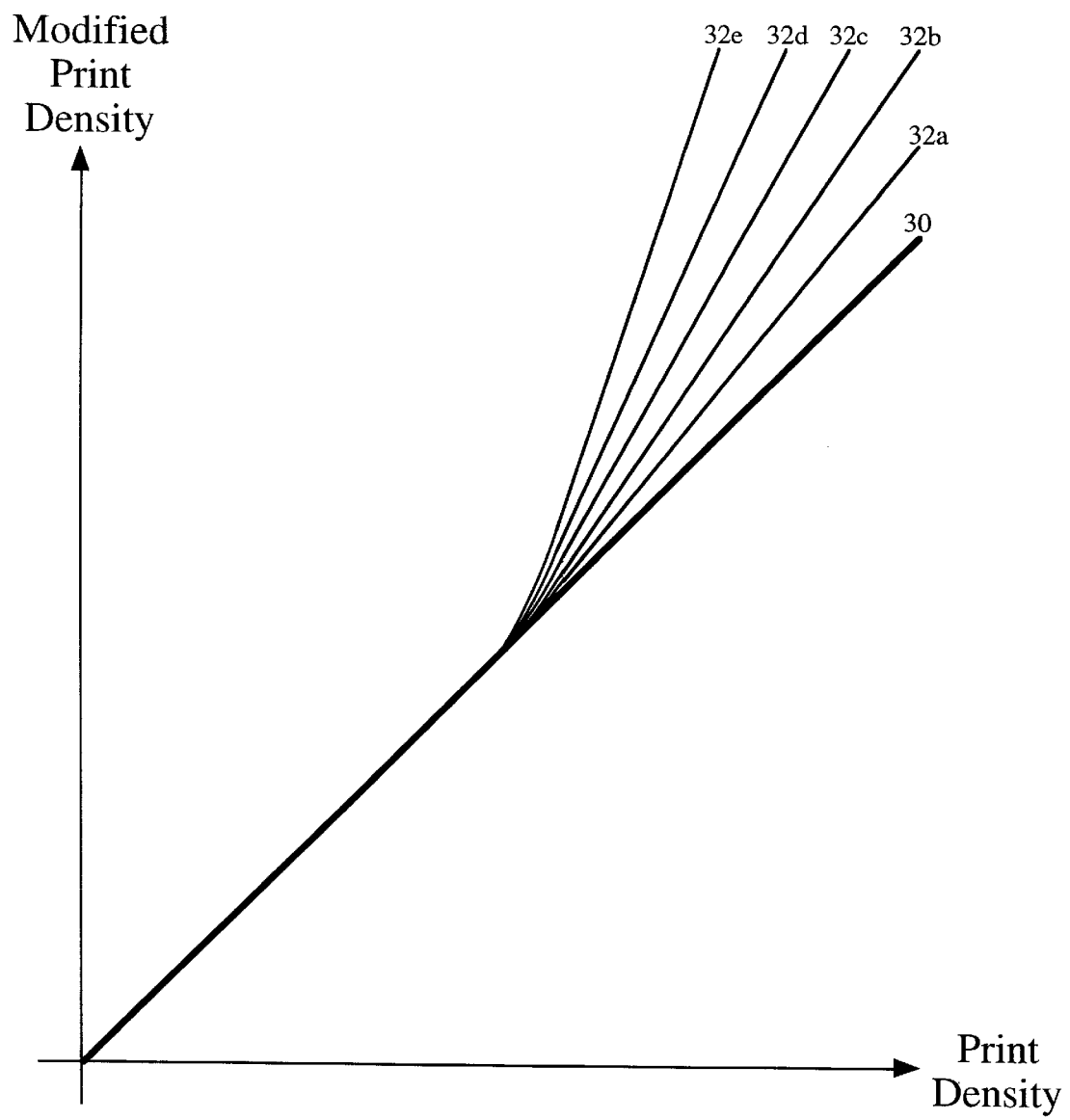

A set or family of such relationships is shown graphically in FIG. 3. In each case, the boost curves 22a–e (FIG. 2) have been added to the graph 30 of the equation z=y to produce corresponding curves 32a–e (FIG. 3).

Substituting equation (1) into equation (2) a new equation is formed:

$$z = F(x) + B(F(x))$$

in which:
x denotes relative log exposure; and
z denotes modified print density.

The new function F(x)+B(F(x)) is denoted by G(x) and defines a new aim curve. Returning to FIG. 1, the new aim curves 12a–e are the result of transforming aim curve 10 in accordance with the example boost curves 22a–e of FIG. 2. Following the choice of parameters for the boost function B(y), the breakpoint 14 (FIG. 1) occurs at a print density of ($y_0$-h).

As discussed in "The Tone Reproduction of Colour Photographic Materials" by Hunt et al, it may be advantageous to gradually increase the contrast of the shoulder end from the mid-region of the aim curve, to Dmax to offset the image degrading effects of viewing flare. However, due to limitations in photographic media (film and paper), it was not possible to achieve the flare reduction which Hunt et al discussed. Hunt et al's disclosure was, in effect, theoretical and was not practically realized.

In accordance with the present invention, the transform is selected to have points between Dmin and Dmax which produce an esthetically pleasing print. Preferably, the contrast of the shoulder of the aim curve is gradually increased to minimize viewing flare.

Those skilled in the art will appreciate that a very practical output device can be a thermal printer which uses a particular thermal print medium which receives sublimable dye. Another output device can be an inkjet printer or an electrophotographic printer.

In accordance with the present invention it should now be clear that one skilled in the art can select an aim curve for a desired medium having a predetermined maximum density. Briefly reviewing, a user selects an aim curve from a family of aim curves for a different medium having a lower predetermined maximum density than that of the desired medium. The aim curve has shadow, midtone, and highlight regions. The user then varies the shadow contrast in the shadow region of the selected aim curve to produce a different aim curve and determines if the varied aim curve for the desired medium that has an improved shadow contrast that will produce prints with reduced flare and permits a better fit of the dynamic range of the original scene to the dynamic range of the medium.

Therefore an aim curve in accordance with the present invention for a desired medium should have a predetermined maximum density for use in printing on a predetermined medium. More particularly, the aim curve has shadow, midtone, and highlight regions. The midtone region is substantially linear and terminating at a breakpoint which has a range of reflection density between 0.8 and 1.5, the shadow region starting at the breakpoint and proceeding upwardly towards Dmax so that it has an increased shadow contrast that will produce prints with reduced flare and permits a better fit of the dynamic range of the original scene to the dynamic range of the medium.

Transforms made in accordance with the present invention can be stored in a computer readable storage medium. When the transform is for a printer, it can be used to produce any desired number of prints from a printer which uses the particular print medium. The computer readable storage medium may comprise, for example; magnetic storage media such as magnetic disc (such as a floppy disc) or magnetic tape; optical storage media such as optical disc, optical tape drive, or machine readable bar code; solid state electronic storage devices such as random access memory (RAM), or read only memory (ROM); or any other physical device or medium employed to store a computer program.

Example 1

Implementation of a Boost in Upper Scale Contrast

A selected increase in upper scale contrast of any digital image is easily be achieved using the Adobe Photoshop Software Program 3.0 or 4.01 manufactured by Adobe, San Jose, Calif. For a given image, to be processed by Adobe Photoshop, the steps to increase upper scale contrast in the printed image are:

1. Go to Image - Adjust - Curves.
2. On the Input-Output Graph fix the Input-Output Code Values by clicking on at least 4 pts down to Input-Output Values of between 80 to 130.
3. Click the Input-Output point of 0—0 and drag the points to read between an Output of 0 and Input value of 30.
4. The preferred values for a typical thermal printer which can produced a Dmax of 2.3 have been found to be Code Values of 11 for Input and 0 Output.
5. The preferred values for a typical ink jet printer with a Dmax of 2.8 have been found to be Code Values of 26 for Input and 0 Output.

Example 2

A Boost in Upper Scale Contrast of the Printed Image

A boost in upper scale contrast of the printed image may also be implemented as follows:

1. Go To Select-Color Range-Shadows and click OK
2. Go To Image-Adjust-Brightness/Contrast.
3. Slide Contrast to a range of 10–30
4. The preferred Contrast for a digital image from a thermal printer with a Dmax of 2.3 is 1.
5. The preferred Contrast for a digital image from an ink jet printer with a Dmax of 2.8 is 26.

Print media, such as thermal print and ink jet receivers, can produce images with a wider dynamic range than previously available. The present invention makes it possible to produce a new transform which will produce tone reproduction curves that are capable of providing an even higher level of image quality than previously obtainable. In accordance with the present invention, it can be a simple task to implement these techniques to optimize tone reproduction curve adjustments.

The invention has been described in detail with particular reference to certain preferred embodiments thereof, but it will be understood that variations and modifications can be effected within the spirit and scope of the invention.

PARTS LIST

10 image capture device characterization test chart
12 image capture device
14 capture device image memory
16 digital computer
18 printer characterization test target
20 printer
22 printer image memory
24 reflection print of test chart 18
26 scene
28 digital computer memory

What is claimed is:

1. A method for selecting an aim curve for a desired medium having a predetermined maximum density, comprising the steps of:
   a) selecting an aim curve from a family of aim curves for a different medium having a lower predetermined maximum density than that of the desired medium, the aim curve having shadow, midtone, and highlight regions;
   b) varying the shadow contrast in the shadow region of the selected aim curve to produce a different aim curve; and
   c) determining the different aim curve with the desired medium that has an improved shadow contrast that will produce prints with reduced flare and permits a better fit of the dynamic range of the original scene to the dynamic range of the medium.

2. A transform made in accordance with claim 1.

3. A method for constructing a transform for a predetermined display or printer, such printer or display being adapted to form a black and white or color image, on a particular medium, the input to the transform being a digital image file produced by a particular image capture device, comprising the steps of:

a) providing an input characteristic curve which is a function of the output color code values from the image capture device and relative log exposure of the scene;
b) providing an aim curve which is a function of the visual density of the display or medium and the image capture relative log exposure wherein the mid region of the aim curve is in a range of contrasts from between 1.00 and 1.30 at a relative log exposure of 0.6 above scene white to a contrast of between 1.0 and 1.7 at a relative log exposure of 1.45 above scene white and at the upper scale region of the aim curve plotted as density vs. relative log E wherein substantially satisfying the following relationship:

$$G(x)=F(x)+B(F(x))$$

wherein:

F(x) is a conventional tone reproduction scale and wherein x is log exposure; and B(F(x)) is a boost function which satisfies the relationship:

$$B(y) = \begin{bmatrix} 0 & \text{if } y < y_0 - h \\ \frac{\text{Tan}(\theta)}{4h}[y - (y_0 - h)^2] & \text{if } y_0 - h \leq y \leq y_0 + h \\ \text{Tan}(\theta)(y - y_0) & \text{if } y_0 - h < y \end{bmatrix}$$

in which:

y denotes any print density;

$y_0$ denotes a particular print density;

θ denotes a particular angle of inclination; and h denotes a particular small increment of print density;

c) providing an output characteristic curve which is a function of the input color code values to the predetermined display or printer and the visual density from a display or print on a particular medium; and d) using the aim curve, the input characteristic curve, and the output characteristic curve to produce the transform.

4. The method of claim 3 wherein the transform is selected to have points between Dmin and Dmax which produce an esthetically pleasing print.

5. The method of claim 3 wherein the contrast of the shoulder of the aim curve is gradually increased to reduce viewing flare.

6. The method of claim 3 wherein, when the transform is for a printer, further including using the transform to produce any desired number of prints from a printer which uses the particular print medium.

7. The method of claim 6 wherein the image capture device is a digital camera and the particular medium is a thermal print medium.

8. The method of claim 6 wherein the printer is an ink jet printer.

9. The method of claim 6 wherein the printer is an electrophotographic printer.

10. A computer program product comprising a computer readable storage medium, including a transform made by the steps of:

a) providing an input characteristic curve which is a function of the output color code values from the image capture device and relative log exposure of the scene;

b) providing an aim curve which is a function of the visual density of the display or medium and the image capture relative log exposure wherein the mid region of the aim curve is in a range of contrasts from between 1.00 and 1.30 at a relative log exposure of 0.6 above scene white to a contrast of between 1.0 and 1.7 at a relative log exposure of 1.45 above scene white and at the upper scale region of the aim curve plotted as density vs. relative log E wherein the aim curve is developed by transforming log exposure into print density composed with a boost function which modifies the print density to achieve the desired aim curve that has an upper scale contrast which minimizes flare and permits a better fit of the dynamic range of the original scene to the dynamic range of the medium.

11. An aim curve for a desired medium having a predetermined maximum density for use in printing on a predetermined medium, comprising:

a) the aim curve having shadow, midtone, and highlight regions; and b) the midtone region being substantially linear and terminating at a breakpoint which has a range of reflection density between 1.0 and 1.5, the shadow region starting at the breakpoint and proceeding upwardly towards Dmax so that it has an increased shadow contrast that will produce prints with reduced flare and permits a better fit of the dynamic range of the original scene to the dynamic range of the medium.

12. The aim curve of claim 11 further including a family of aim curves, any one of which can be chosen to best fit the dynamic range of the scene to the dynamic range of the media.

* * * * *

UNITED STATES PATENT AND TRADEMARK OFFICE
CERTIFICATE OF CORRECTION

| | | |
|---|---|---|
| PATENT NO. | : 6,229,624 B1 | Page 1 of 1 |
| APPLICATION NO. | : 09/057903 | |
| DATED | : May 8, 2001 | |
| INVENTOR(S) | : Paul B. Gilman | |

It is certified that error appears in the above-identified patent and that said Letters Patent is hereby corrected as shown below:

ON THE TITLE PAGE, ITEM [54] AND IN THE SPECIFICATION, COLUMN 1, LINE 1

The title, delete "TRANFORM" and insert --TRANSFORMS--

Signed and Sealed this
Eighth Day of April, 2014

Michelle K. Lee
*Deputy Director of the United States Patent and Trademark Office*